United States Patent
Shirai

(10) Patent No.: US 11,079,985 B2
(45) Date of Patent: Aug. 3, 2021

(54) INFORMATION PROCESSING SYSTEM, AND CONTROL METHOD FOR PRINTING DOWNLOADED PRINT DATA

(71) Applicant: CANON KABUSHIKI KAISHA, Tokyo (JP)

(72) Inventor: Kenichi Shirai, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/191,107

(22) Filed: Nov. 14, 2018

(65) Prior Publication Data
US 2019/0155557 A1 May 23, 2019

(30) Foreign Application Priority Data
Nov. 17, 2017 (JP) .............................. JP2017-221614

(51) Int. Cl.
*G06F 3/12* (2006.01)
*H04N 1/00* (2006.01)

(52) U.S. Cl.
CPC .......... *G06F 3/1247* (2013.01); *G06F 3/1206* (2013.01); *G06F 3/1288* (2013.01); *G06F 3/1297* (2013.01); *H04N 1/00244* (2013.01)

(58) Field of Classification Search
None
See application file for complete search history.

(56) References Cited

U.S. PATENT DOCUMENTS

| | | | | |
|---|---|---|---|---|
| 2007/0206212 A1* | 9/2007 | Ohno | ..................... | G06F 3/1248 358/1.14 |
| 2008/0304751 A1* | 12/2008 | Hayasaki | .............. | G06K 9/3275 382/195 |
| 2009/0284779 A1* | 11/2009 | Isshiki | ............... | H04N 1/00347 358/1.13 |
| 2015/0077794 A1* | 3/2015 | Ezoe | ..................... | G06F 3/1284 358/1.15 |
| 2015/0262042 A1* | 9/2015 | Watanabe | ............... | G06F 3/121 358/1.15 |
| 2017/0031638 A1* | 2/2017 | Kitagata | ............ | H04N 1/32523 |

FOREIGN PATENT DOCUMENTS

JP     4509965 B2     7/2010

* cited by examiner

*Primary Examiner* — Mohammad H Ghayour
*Assistant Examiner* — Pawan Dhingra
(74) *Attorney, Agent, or Firm* — Canon U.S.A., Inc. IP Division

(57) ABSTRACT

A first hash value calculated by a print server based on print data and a second hash value calculated by an image processing apparatus by using the print data are compared, and printing processing using the print data is cancelled in a case where it is determined that the first hash value and the second hash value are not the same.

8 Claims, 15 Drawing Sheets

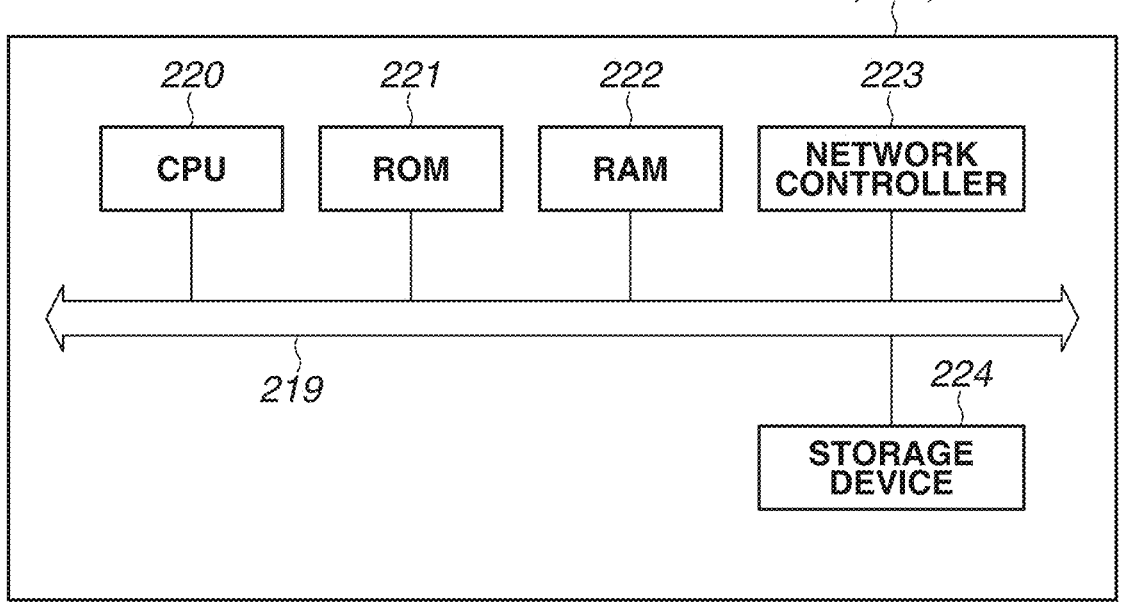
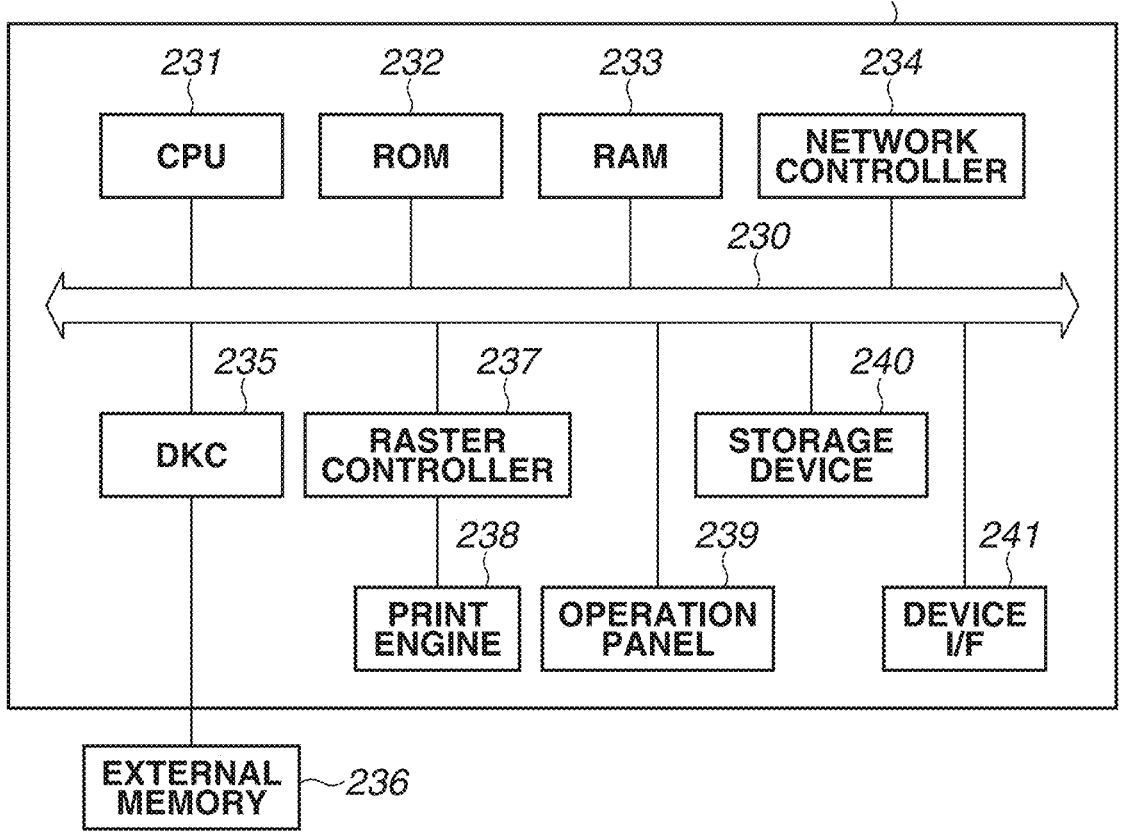

FIG.5A

```
LOG-IN SCREEN                    ☒  — 500

USER NAME   [_____] — 501

PASSWORD    [_____] — 502

503 — [ LOG-IN ]
```

FIG.5B

| <DOCUMENT LIST> | | | — 510 |
|---|---|---|---|
| 511 — | DOCUMENT NAME (512) | STATUS (513) | |
| ☐ | DOCUMENT A | STAND-BY | |
| ☐ | DOCUMENT B | PRINTING | |
| ☐ | DOCUMENT C | NORMAL END | |

[ PRINT ] — 514

FIG.5C

<PRINT SETTING> — 520

| PRINTER NAME: | PRINTER-A | CHANGE — 522 |
|---|---|---|
| PRINTING RANGE: | ⦿ ALL  ○ SPECIFIED PAGE | |
| SHEET SIZE: | SAME AS DOCUMENT SIZE ▼ | |
| NO. OF COPIES: | 1 | COPY |
| PAGE AGGREGATION: | 1 in 1 ▼ | |
| PRINTING METHOD: | TWO-SIDED PRINTING ▼ | |
| SHEET FEEDER: | AUTO ▼ | |
| COLOR MODE: | | |
| ... | ... | |

524 (left label), 521 (right bracket)

[ PRINT ] — 523

FIG.6

JOB INFORMATION 600

| | |
|---|---|
| 601 | JOB ID |
| 602 | DOCUMENT ID |
| 603 | USER NAME |
| 604 | RECEPTION DATE/TIME |
| 605 | PRINTER ID |
| 606 | INDEX FILE URL |
| 607 | CONVERSION STATUS |
| | ... |

PRINTER INFORMATION 610

| | |
|---|---|
| 611 | PRINTER NAME |
| 612 | PRINTER ID |
| 613 | PRINTER URL |
| 614 | CONFIGURATION INFORMATION |
| 615 | COMPRESSION METHOD |
| | ... |

DOCUMENT INFORMATION 620

| | |
|---|---|
| 621 | DOCUMENT ID |
| 622 | DOCUMENT NAME |
| 623 | USER NAME |
| 624 | DOCUMENT URL |
| 625 | STATUS |
| | ... |

PRINTING QUEUE INFORMATION 640

| | |
|---|---|
| 641 | PRINTER ID |
| 642 | JOB LIST |
| | ... |

PRINTING QUEUE INFORMATION 630

| | |
|---|---|
| 631 | JOB ID |
| 632 | INDEX FILE URL |
| 633 | AUTHENTICATION TOKEN |
| 634 | PRINTER ID |
| 635 | PRINT DATA URL LIST |
| | ... |

636

| | |
|---|---|
| | PRINT DATA URL |
| 637 | HASH VALUE |
| 638 | TOTAL HASH VALUE |

```
Index.json

{
  "datalist":[
    {
      "url":"http://.../1.pdl.gz",  ~704
      "hash":"bbbbbbbbbb"  ~705
    }
  ]
  "end":false
}
 703
```

```
Index.json

{
  "datalist":[
    {
      "url":"http://.../1.pdl.gz",
      "hash":"bbbbbbbbbb"
    },
    ...,
    {
      "url":"http://.../5.pdl.gz",
      "hash":"zzzzzzzzzz"
    }
  ]
  "end":true
}
 703
```

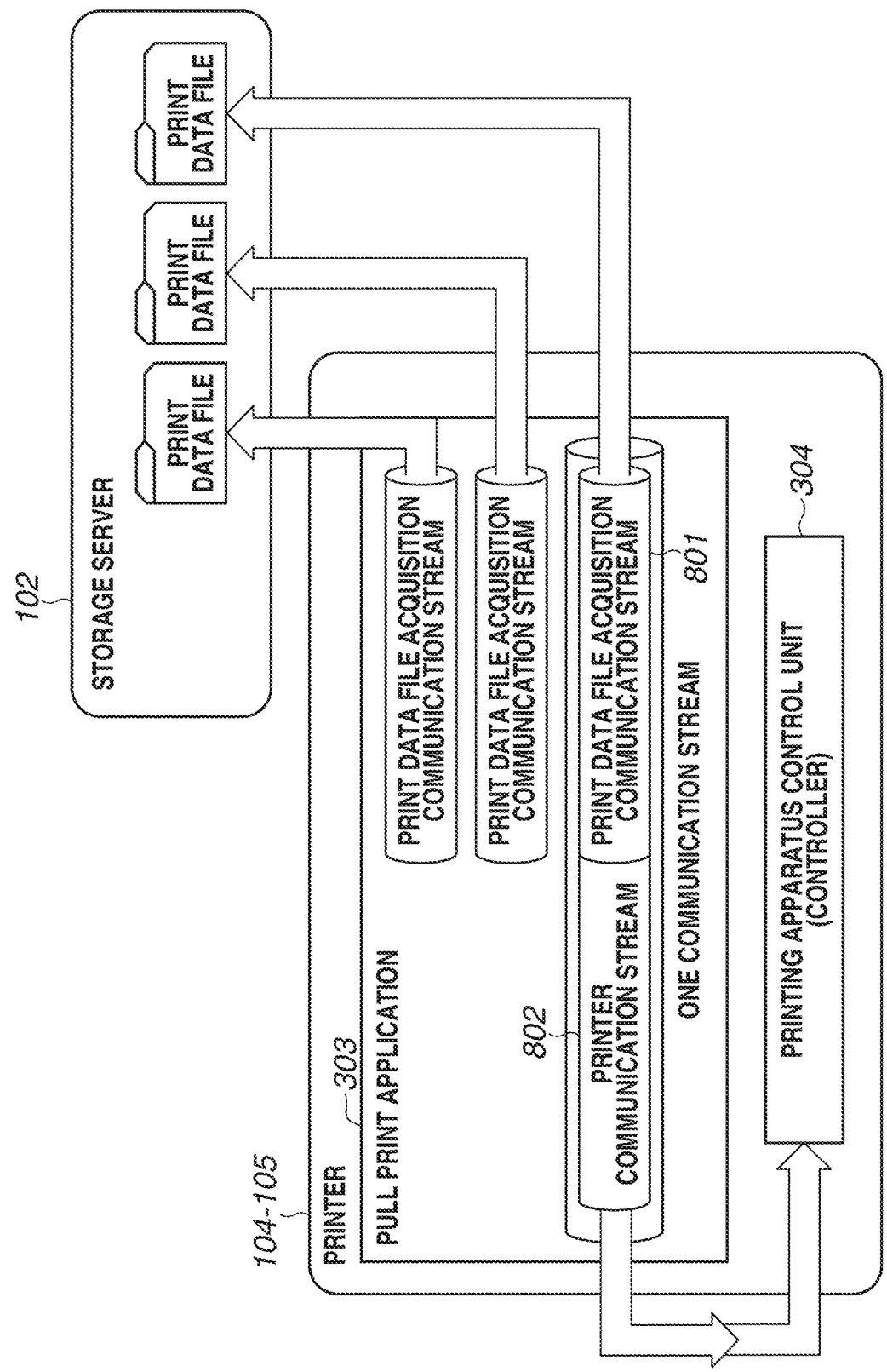

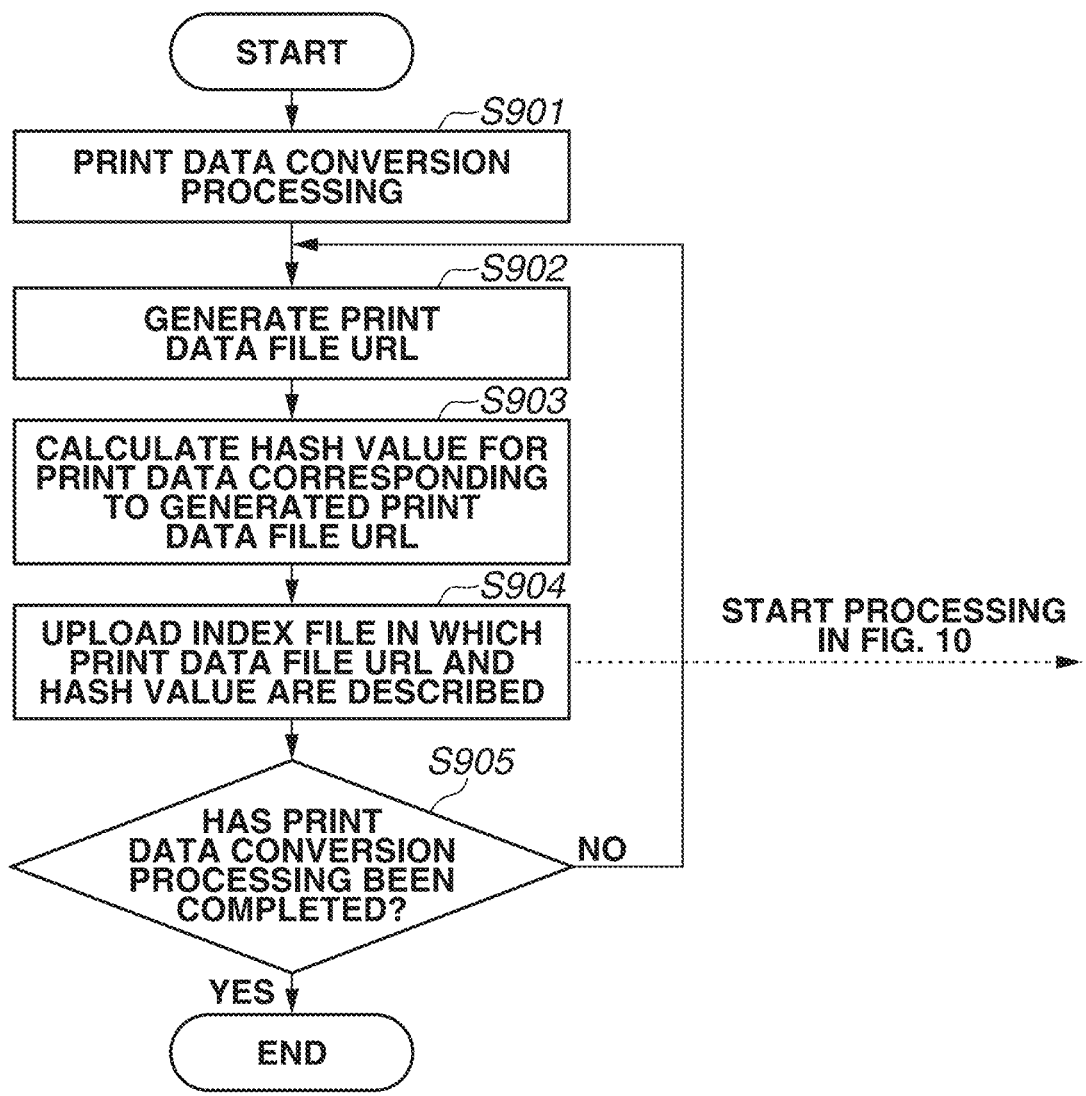

INFORMATION PROCESSING SYSTEM, AND CONTROL METHOD FOR PRINTING DOWNLOADED PRINT DATA

BACKGROUND

Field of the Disclosure

The present disclosure relates to an information processing system in which downloaded print data is printed with a printer, a control method, and a storage medium,

Description of the Related Art

In recent years, business for providing a cloud service by using a virtual server on a cloud system has been expanded. Such service includes storage service for saving data in a file format and database service for providing a database function.

Furthermore, to realize a print system, print service and data conversion service are provided using a virtual server on a cloud system in some configurations. Such cases have an advantage in that a hardware print server does not have to be managed at each client. Those cases have another advantage in that computing resources can be increased according to a load on the virtual server.

With the spread of the cloud service, a pull print environment in which a printer acquires print data from a print server via the internet and execute printing has become popular. In the pull print environment, document data is processed in the cloud system through decentralized processing using a large volume of computing resources, and thus, many requests from the clients can be processed simultaneously. To manage print data in the cloud system, the cloud system needs to have a data conversion function for converting print data into data in a format interpretable by various types of printers. In this data conversion function, a typical function for executing data conversion with a data conversion driver of a client terminal is realized on the cloud system. Japanese Patent No. 4509965 discusses a job rendering system in which a plurality of different servers performs data conversion processing for each document type.

SUMMARY

According to an aspect of the present disclosure, an information processing system includes a print server configured to convert document data into print data and an image processing apparatus configured to execute printing processing by using the print data, wherein the print server includes a first calculation unit configured to calculate a first hash value based on print data consisting of the print data, wherein the image processing apparatus includes a second calculation unit configured to calculate a second hash value by using the print data, a comparison unit configured to compare the first hash value and the second hash value, and a cancellation unit configured to cancel printing processing using the print data in a case where the comparison unit determines that the first hash value and the second hash value are not same.

Further features of the present disclosure will become apparent from the following description of exemplary embodiments with reference to the attached drawings.

BRIEF DESCRIPTION OF THE DRAWINGS

FIG. 2A is a diagram illustrating a hardware configuration of various servers, and FIG. 2B is a diagram illustrating a hardware configuration of various apparatuses.

FIGS. 5A, 5B, 5C, 5D, and 5E are diagrams illustrating examples of web screens displayed on a web browser 302.

FIG. 6 is a diagram illustrating various types of data managed by the print server or a pull-print application.

FIGS. 7A and 7B are diagrams illustrating examples of an index file.

FIG. 8 is a conceptual diagram illustrating a communication system of the pull-print application.

FIG. 9 is a flowchart illustrating print data conversion processing of a print server.

DESCRIPTION OF THE EMBODIMENTS

In order to accelerate the first printout time for input document data, there is provided a configuration in which a print server sequentially transmits print data of a completed page to a printer and the printer is caused to print the transmitted print data, without waiting for completion of the entire print data. More specifically, the printer downloads, whenever necessary, a piece of print data generated in a divided state and executes printing.

In a case where print data is sequentially transmitted to a printer or acquired from a storage server, a part of the print data may remain in an imperfect state. Herein, the imperfect state refers to a state such as missing arising in a part of characters or shift arising in rendering. Many print settings for a print document, such as an N-up print setting, a two-sided print setting, and a staple print setting, require all of the pages to be printed in a desired state, and inclusion of any imperfect page results in an imperfect print product.

As a method for detecting imperfectness of print data, the use of a checksum (type of error-detecting code) generally enables detection if imperfectness is to be detected in a network transfer path. However, in a configuration which print data for a completed page is sequentially transmitted to a printer and the transmitted print data is printed, an imperfect printed product may be output if imperfectness is detected after the entire print data is received because the printer has already started printing processing.

The present disclosure is directed to preventing imperfect printed product from being output by detecting imperfect print data in a system in which print data of a completed page is sequentially transmitted to a printer and the transmitted print data is printed.

According to an aspect of the present disclosure, in a system in which print data of a completed page is sequentially transmitted to a printer and the transmitted print data is printed, it is possible to prevent imperfect printed matter from being output by detecting imperfect print data.

Hereinafter, an exemplary embodiment embodying the present disclosure will be described with reference to the accompanying drawings.

<Network Configuration>

Figure 1:
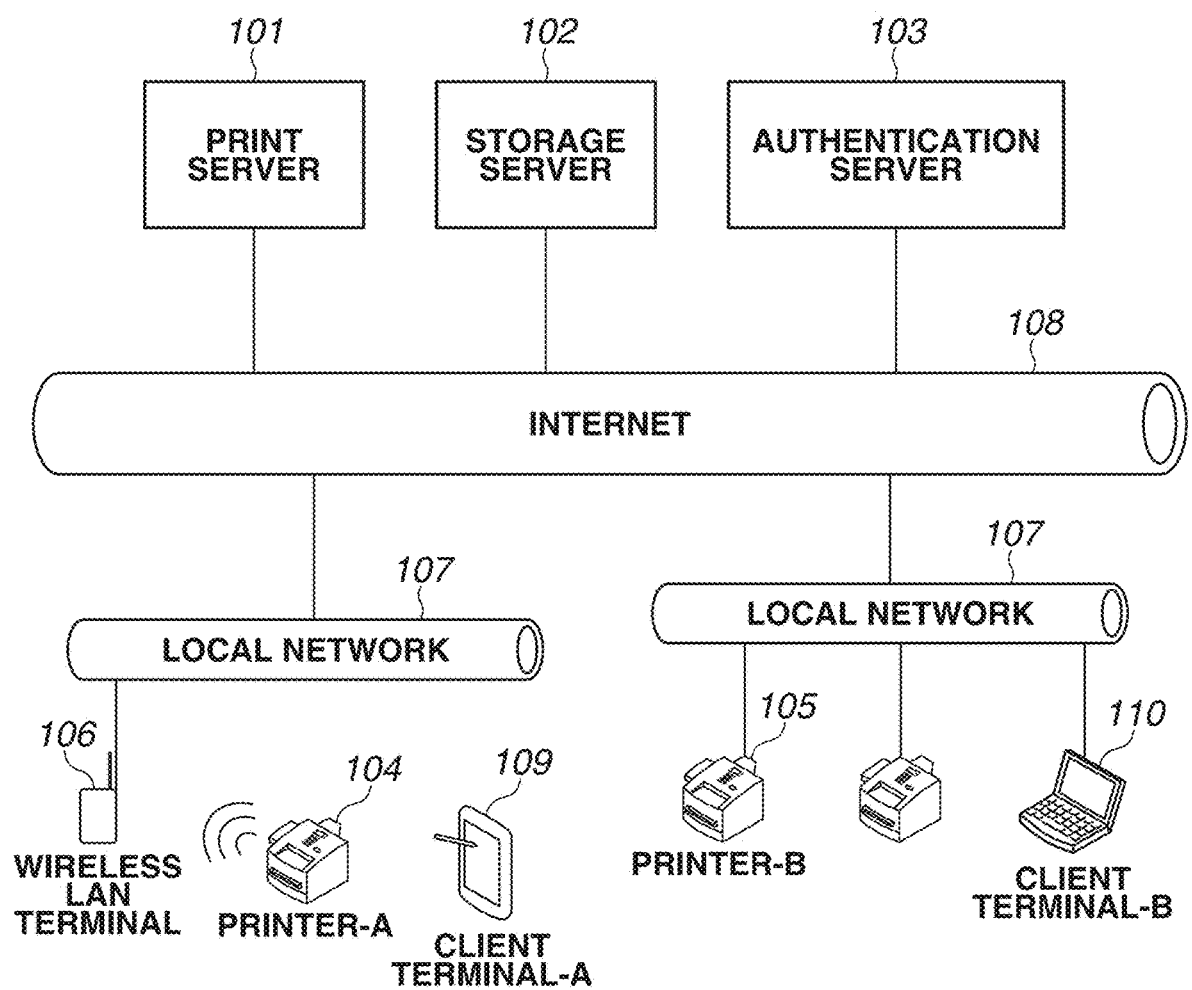
FIG. 1 is a block diagram illustrating a network configuration.

A first exemplary embodiment of the present disclosure will be described below in detail. FIG. 1 is a block diagram illustrating a network configuration of an information processing system according to the present exemplary embodiment. In FIG. 1, it is assumed that a plurality of apparatuses, a printer-A 104, a printer-B 105, a client terminal-A 109, and a client terminal-B 110, are connected via local networks 107. In FIG. 1, although three printers and two client terminals are illustrated, the number of printers and the number of the terminals are not limited thereto.

The printer-A 104, the printer-B 105, the client terminal-A 109, and the client terminal-B 110 access an internetwork 108 via the corresponding one of the local networks 107, and access a print server 101, a storage server 102, and an authentication server 103. The printer-A 104, the printer-B 105, the client terminal-A 109, and the client terminal-B 110 are connected to the local network 107 via a wired or a wireless local area network (LAN). In the present exemplary embodiment, it is assumed that the printer-A 104 and the client terminal-A 109 are connected to the local network 107 via a wireless LAN terminal 106, while the printer-B 105 and the client terminal-B 110 are connected to the local network 107 via a wired LAN.

The wireless LAN terminal 106 is a base unit of a wireless LAN having a typical network router function, and provides a wireless LAN at home or in the office. The local networks 107 and an internetwork 108 may be any communication network, such as the internet, a LAN, and a wide area network (WAN) capable of transmitting or receiving data. A communication method through which the client terminal-A 109 or the client terminal-B communicates with the servers 101 to 103 may be different from a communication method through which the printer-A 104 or the printer-B 105 communicates with the servers 101 to 103. The printer-A 104 and the printer-B 105 each are an image processing apparatus including at least a printing function, such as a multifunction peripheral (MFP).

Examples of the client terminal-A 109 or the client terminal-B 110 includes a desktop personal computer, a notebook computer, a mobile computer, a personal digital assistant (PDA), and a mobile phone that internally includes a program-execution environment. The client terminal-A 109 and the client terminal-B 110 each include therein an environment for executing a program of, for example, a web browser (browser made available for the use of an internet browser, a WWW browser, and a browser used for the World Wide Web). Hereinafter, although description will be given with the combination of the printer-A 104 and the client terminal-A 109 as an example, the same can be also applied to the combination of the printer-B 105 and the client terminal-B 110 or a combination of another printer and another client terminal unless otherwise specified.

The print server 101 receives identification information for identifying a document to be printed and identification information for identifying the printer-A 104 from a web browser of the client terminal-A 109 together with a printing request. The print server 101 then transmits a response including a printing command (541 in screen 540) for executing printing instruction to the web browser of the client terminal-A 109. The web browser of the client terminal-A 109 issues a printing command to the printer-A 104. The printer-A 104 receives the printing command from the web browser of the client terminal-A 109 and acquires an index file 701 (described below) which the URL of the storage server 102 is described. The printer-A 104 accesses the URL of the index file 701 and acquires print data from the storage server 102 to execute printing.

The authentication server 103 retains authentication information, such as a user name, a password, an authentication token, and an authorization token which are used for accessing the print server 101.

<Hardware Configuration of Print Server>

FIG. 2A is a diagram illustrating an example of a hardware configuration of the print server 101, the storage server 102, or the authentication server 103. Unless otherwise specified, it is to be understood that the present disclosure is applicable to a single device as well as a system including a plurality of devices as long as the functions of the present disclosure can be executed. Moreover, unless otherwise specified, it is to be understood that the present disclosure is applicable to a system in which connection is established through a network, such as a LAN or a WAN, and processing is executed, as long as the functions of the present disclosure is executable. In the present exemplary embodiment, it is assumed that respective constituent elements are connected to each other through a system bus 219.

A central processing unit (CPU) 220 is a control device of the information processing apparatus, which executes, for example, an application program and an operating system of the print server 101 stored in a storage device 224. The CPU 220 executes control for temporarily storing, for example, information necessary to execute a program and a file in a random access memory (RAM) 222. The CPU 220 executes processing of, for example, converting data to print data with a print server program.

A read only memory (ROM) 221, serving as a storage unit, internally stores a program, such as a basic input-output (I/O) program, font data used for converting data into print data, and various data necessary for printing processing or data conversion processing. The RAM 222, serving as a temporary storage unit, functions as a main memory or a work area of the CPU 220. The storage device 224, which is one type of an external storage unit, functions as a large-capacity memory, and stores, for example, an application program and an OS. A network controller 223 is a network interface card. (NIC). The print server 101 transmits and receives data to and from an external device via the network controller 223. The same can be also applied to a network controller 234 (described below).

<Hardware Configuration of Printer>

FIG. 2B is a diagram illustrating a hardware configuration of the printer-A 104 or the printer-B 105. Respective constituent elements of the hardware are connected to a system bus 230. Herein, although the hardware configuration will be described by taking the printer-A 104 as an example, the same can be also applied to the printer-B 105, A CPU 231 executes control of the entirety of the apparatus, and performs centralized control of accesses to respective devices connected to the system bus 230. This control is executed on the basis of a control program stored in a ROM 232 or a control program or a resource data (resource information) stored in an external memory 236 connected thereto via, for example, a disk controller (DKC) 235.

A RAM 233 functions as a main memory or a work area of the CPU 231, and a memory capacity thereof can be expanded with an optional RAM connected to an expansion port (not illustrated).

A storage device 240 includes an external storage unit functioning as a large-capacity memory. An operation panel 239 (operation unit) displays a screen and receives an operation instruction which a user inputs via the screen. A display unit, such as a button or a liquid crystal panel, for displaying an operation mode setting and an operation status of the printer-A 104 and enabling a user to execute operation for specifying content data to be printed, is also arranged.

A print engine 238 employs a known printing technique. Examples of exemplary systems thereof include an electro-photographic system (laser beam system), an ink-jet system, or a sublimation system (thermal transfer system).

A raster controller 237 convers print data in a page description language (PDL) format into image data. A device interface (I/F) 241 is a connection interface for an external device connectable through a universal serial bus (USB).

<System Configuration of Information Processing System>

Figure 3:
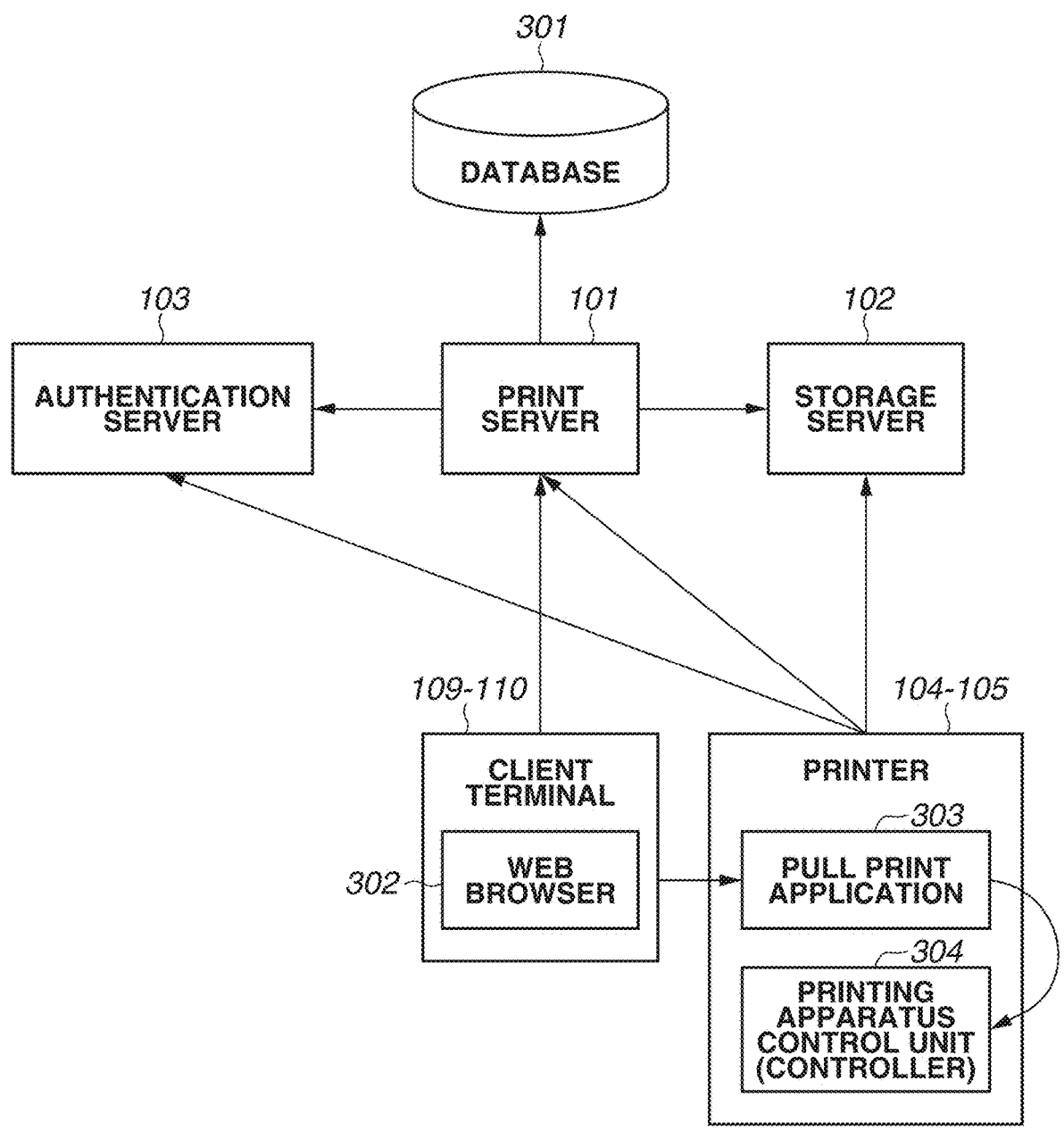
FIG. 3 is a conceptual diagram illustrating operations of various severs and apparatuses of the information processing system.

Operations of each apparatus will be described with reference to a configuration diagram of the information processing system in FIG. 3. The operations is realized by a CPU executing a program stored in a memory of each of the apparatuses.

The print server 101 generates a URL indicating an acquisition source of document data and transmits the generated URL to another server. The generated URL indicates an upload destination for the document data with respect to the storage server 102. In response to the print server 101 receiving a printing request from the user, the print server 101 uploads the document data as a printing target to that URL. When the print server 101 receives a notification indicating the completion of the upload from another server, the print server 101 stores document information 620 about the input document data in a database 301.

The print server 101 receives a document ID 621 together with the printing request from the Web browser 302, acquires document data specified by the document ID 621 from the storage server 102, and converts the document data into print data. After generating the print data, the print server 101 generates a download URL on the storage server 102. The print server 101 describes that download URL in an index file and uploads the print data to the download URL The print server 101 then uploads the index file to the storage server 102.

The print server 101 transmits an authentication token included in the printing request received from the Web browser 302 to the authentication server 103, and the authentication token is verified by the authentication server 103. If the authentication token is not included in the printing request, the print server redirects the printing request to the authentication server 103. The authentication server 103 then transmits a log-in screen 500 to the Web browser 302. FIG. 5A illustrates an example of the log-in screen 500.

After a user pushes a log-in button (503), the authentication server 103 checks a user name (501) and a password (502) input via the log-in screen 500 against a user name and a password retained in the authentication server 103 to execute verification. When the verification has succeeded, the authentication server 103 issues and transmits an authentication token in association with the user information to the web browser 302.

The web browser 302 transmits a request including the authentication token to the print server 101 and displays a web screen on the basis of a response from the print server 101. Examples of web screens are illustrated in FIGS. 5B to 5E. Details of the web screen will be described below.

The authentication token issued by the authentication server 103 is a token for a pull print application 303 to access the print server 101. The authentication server 103 verifies the authentication token included in the request ransmitted to the print server 101 from the pull print application 303.

The pull print application 303 transmits the request including the authentication token to the print server 101 to acquire an index file. The pull print application 303 acquires print data from the storage server 102 in accordance with the index file, and transmits the print data to a printing apparatus control unit 304. The printing apparatus control unit 304 executes printing by using the print data. A system configuration and an operation of the information processing system have been described above.

<Software Configuration of Print Server>

Figure 4A:
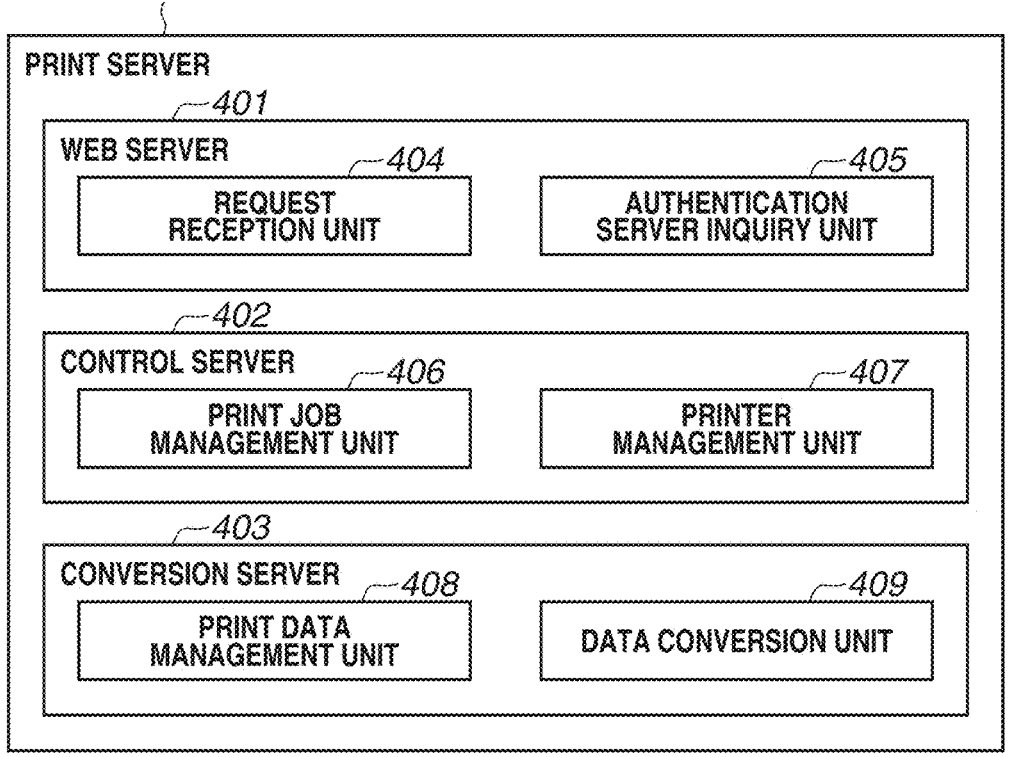
FIG. 4A is a block diagram illustrating functions included in a print server.

FIG. 4A is a diagram illustrating a software configuration of the print server 101 according to the present exemplary embodiment. Each function of the print server 101 is stored in the storage device 224 illustrated in FIG. 2A, and each function is loaded on the RAM 222 and executed by the CPU 220. A function of the print server 101 executed in a case where the print server 101 receives a request from an external device will be described below with reference to FIG. 4A.

The print server 101 includes a web server 401 which receives an external request, a control server 402 which manages documents, print jobs, and printer information and executes control of printing processing, and a conversion server 403 which converts document data into print data. The servers 401, 402, and 403 each are an independent program and installable on a different information processing apparatus. These programs each are installed in an information processing apparatus connected to the network, and communication is executed between these programs. In the present exemplary embodiment, it is assumed that these programs are installed in the same information processing apparatus. Each of the servers may be provided as a monolithic configuration or a redundant configuration. Thus, a plurality of information processing apparatuses may be configured for a single server.

The web server 401 includes a request reception unit 404 having the function of receiving a request for inputting document data, printing request, or a print data acquisition request, and an authentication server inquiry unit 405. The authentication server inquiry unit 405 has the function of transmitting a verification request for a token included in a request to the authentication server 103 in a case where the request reception unit 404 receives the request.

The control server 402 includes a print job management unit 406 and a printer management unit 407. The print job management unit 406 has the function of generating document information 620 based on the received request for inputting the document data and saving the document information 620 in the database 301. The print job management unit 406 has the function of generating job information 600 based on the received printing request and saving the job information 600 in the database 301.

The printer management unit 407 has the function of managing the information (printer information 610) relating to the printer-A 104 and providing the printer information 610 to the print job management unit 406.

The conversion server 403 includes a print data management unit 408 (first calculation unit) and a data conversion unit 409. The print data management unit 408 has the function of downloading document data from the storage server 102 based on a print data conversion instruction from the control server 402. The data conversion unit 409 has the function of converting the downloaded document data into print data. The print data management unit 408 further has the function of generating print data file URLs by the number of the print data files generated by the data conversion unit 409, and generating an index file in which these URLs are described. The functions included in the print server 101 and operations thereof have been described above.

It is assumed that the servers 101 to 103 in the present disclosure are provided in a form of cloud computing, and the function (auto-scale function) of automatically increasing or decreasing the number of servers according to the processing loads and the occurrence of failures in the various servers is realizable. For example, according to a status such as the number of accesses or the number of requests existing in a message queue service, the number of the servers, i.e., the servers 101 to 103, can be automatically increased or decreased or a specific server can be automatically included or excluded, In the present exemplary embodiment, the web server 401, the control server 402, and the conversion server 403 are functions included in the print server 101. However, the configuration is not limited thereto, and the function realized by each of the web server 401, the control server 402, and the conversion server 403 may be independently realized by separate servers.

<Software Configuration of Printer>

Figure 4B:
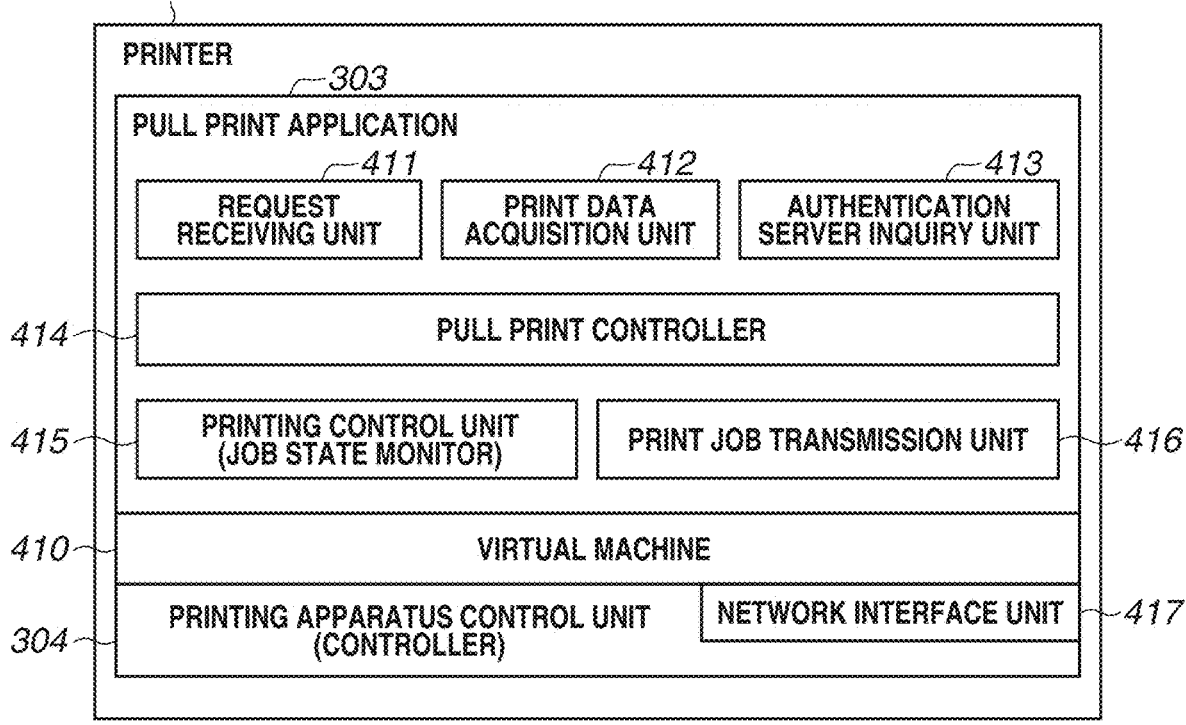
FIG. 4B is a block diagram illustrating functions included in a printer.

A software configuration of the printer-A 104 or the printer-B 105 will be described below with reference to FIG. 4B. The functions of the printer-A 104 are stored in the storage device 240, and the functions are loaded on the RAM 233 and executed by the CPU 231. Herein, operations of the functions of the printer-A 104 in a case where the printer-A 104 receives an external request will be described.

The pull print application 303 is application software operating on a virtual machine 410. A pull print controller 414 manages general operations of the pull print application 303. Operation instructions are transmitted to the corresponding unit via the pull print controller 414.

The request receiving unit 411 has the function of receiving a printing request from the web browser 302 and transmitting printing request information to the print data acquisition unit 412 (second calculation unit, comparison unit, cancellation unit, and determination unit) based on the received printing request. The printing request information includes a job ID 601 and a printer ID 605. The print data acquisition unit 412 has the function of acquiring print data based on the printing request information and managing the authentication token as printing queue information 630.

The authentication inquiry unit 413 has the function of managing a client certification authorized by the authentication server 103. The authentication inquiry unit 413 uses the certification to acquire the authentication token from the authentication server inquiry unit 405.

A printing control unit 415 (cancellation unit and execution unit) has the function of inquiring the printing apparatus control unit 304 about a print job status via the virtual machine 410 during the printing process. A print job transmission unit 416 retains print data acquired from the print data acquisition unit 412 in a transmission buffer stream (described below) and transmits the print data to the printing apparatus control unit 304. The printing apparatus control unit 304 is a controller which executes printing by using the print data.

The network interface unit 417 has the function of relaying print data between the printing apparatus control unit 304 and the print job transmission unit 416. The functions included in the printer-A 104 and operations of various functions have been described above.

<Various Types of Information>

Information managed by the respective servers will be described with reference to FIG. 6.

Job information 600 is generated by the print job management unit 406 and managed in the database 301. The job information 600 includes the following information: a job ID 601 for identifying a print job; a document ID 602 corresponding to a document ID 621 of the document information 620; a user name 603 associated with an authentication token; receiving date and time 604 of a printing request; a printer ID 605 as an identifier of the printer-A 104; an index file URL 606; and a conversion status 607. An initial value of the conversion status 607 is "unprocessed", and the initial value is updated to "conversion started", "conversion completed", and "conversion error" by the control server 402.

The printer information 610 is managed by the printer management unit 407. The printer information 610 includes the following information: a printer name 611; a printer ID 612 corresponding to the printer IL) 605; a printer URL 613 for the web browser 302 to transmit a printing request to the printer-A 104 from; a configuration information 614; and a compression method 615 that can be used for print data. The printer ID 612 is associated with a printer name 524 of a print setting screen 520 to be displayed on the web browser 302. The configuration information 614 indicates the function of the printer-A 104 corresponding to a print setting 521 of the print setting screen 520. For example, the configuration information 614 includes a function, such as a two-sided function or a color function.

The document information 620 is managed by the database 301. The document information 620 includes the following information: a document ID 621, a document name 622; a user name 623 associated with an authentication token; a document URL 624 for uploading a document to the storage server 102; and a status 625. The document information 620 is generated by the print job management unit 406 and saved in the database 301. The document ID 621 is associated with the document name 622 of the document information 620 corresponding to a document name 512 of a document list screen 510 displayed on the web browser 302.

The document ID 621 is included in the document URL 624. The status 625 is information indicating a status, such as "receiving", "stand-by", "printing queue", "printing", "normal end", "error end", and "unknown end", Printing queue information 640 is managed by the print job management unit 406. The printing queue information 640 includes a print ID 641 and a job list 642 for managing the job ID 601.

Printing queue information 630 is managed by the print data acquisition unit 412. The printing queue information 630 includes the following information: a job ID 631, an index file URL 632, an authentication token 633, a printer ID 634, and a print data URL list 635. Further, the print data URL list 635 retains a print data URL 636, a hash value 637, and a total hash value 638 in a list format. The various types of information have been described above.

<Index File>

An index tile 701 will be described with reference to FIGS. 7A and 7B. As described above, the index file 701 includes a print data URL 704 and a hash value 705. The hash value 705 is a value acquired from a print data file corresponding to the print data URL 704 through hash calculation.

Referring now to FIG. 7A, in a case where an end flag 703 of the index file 701 in FIG. 7A is "false", conversion processing of print data is being executed but has not been completed by the print server 101, and that a print data file URL ill be added further. In such a case, as soon as the processing of acquiring the print data file corresponding to the URL in which the print data file is described ends, the print data acquisition unit 412 acquires the index file URL 632 from the storage server 102 again. An example of the index file 701 in the above-described state is illustrated in FIG. 7A.

The end flag 703 being "true" indicates that the print data has been acquired entirely, and the print job transmission unit 416 closes a printer communication stream 802 (described below). An example of the index file 701 in this state is illustrated in FIG. 7B. The index file 701 has been described above.

<Configuration of Communication System of Pull Print Application 303>

A configuration of a communication system will be described with reference to FIG. 8. FIG. 8 is a conceptual diagram in which the print job transmission unit 416 transmits a print data file to the printing apparatus control unit 304 through a single communication connection while the print data acquisition unit 412 of the pull print application 303 is acquiring the print data file from the storage server 102.

First, as soon as print data conversion is executed, the print server 101 uploads the generated print data to the storage server 102 as one print data tile. The pull print application 303 quickly transmits the print data to the printing apparatus control unit 304, so that the print engine 238 can quickly start executing time-consuming preprocessing. This accelerates a first printout time of the printer-A 104.

The print job transmission unit 416 of the pull print application 303 has to transmit the print job to the printing apparatus control unit 304 through a single communication connection. Thus, the pull print controller 414 maintains a print data file acquisition communication stream 801 and a printer communication stream 802 as a single communication stream. The print data file acquisition communication stream 801 is communication between the print data acquisition unit 412 of the printer-A 104 and the storage server 102. More specifically, the print data file acquisition communication stream 801 is communication via the internet which uses the Hyper Test Transfer Protocol Secure (HTTPS) as a communication protocol.

In contrast, the printer communication stream 802 is communication between the print job transmission unit 416 and the network interface unit 417 of the printing apparatus control unit 304. More specifically, the printer communication stream 802 is local network communication between the printer-A 104 and the printer-A 104 of a different port with a RAW protocol as the communication protocol.

The print data acquisition unit 412 executes the following processing when the second and the subsequent print data files are acquired from among the print data files constituting the print job. The pull print controller 414 reconnects the print data file acquisition communication stream 801 newly created by the print data acquisition unit 412 to the existing printer communication stream 802 and maintains the communication streams 801 and 802 as a single communication stream. This configuration enables a plurality of divided print data files to be printed as a single print job.

The configuration of the communication system of the storage server 102 and the printer-A 104 has been described above.

<Transmission Processing of Printing Request via Web Browser 302>

A web screen which is generated by the web server 401 of the print server 101 and displayed on the web browser 302 of the client terminal-A 109 and the processing of transmitting a printing request, which is executed via the web screen, will be described with reference to FIGS. 5A to 5E.

In a case where a document list request is transmitted to the print server 101 from the web browser 302, the print server 101 generates a document list screen 510 and transmits the generated document list screen 510 to the web browser 302. An example of the document list screen 510 is illustrated in FIG. 513. The document list screen 510 includes a document selection checkbox 511, a document name 512, a status 513, and a print button 514. The status 513 corresponds to the status 625 of the document information 620, and the print server 101 displays the status 625 at the time the document list request is received as the status 513 of the document list screen 510. The document selection checkbox 511 is a checkbox for selecting a document to be printed, and a plurality of documents may be selected thereby. When the web browser 302 detects a press of the print button 514, a document list of the selected document selection checkbox 511 is transmitted to the print server 101.

The print server 101 that has received the document list generates a print setting screen 520, and transmits the print setting screen 520 to the web browser 302. An example of the print setting screen 520 is illustrated in FIG. 5C. The print setting screen 520 is a setting screen of a print setting 521, and a printer name 524 represents the name of the printer that executes printing.

Figure 5D:
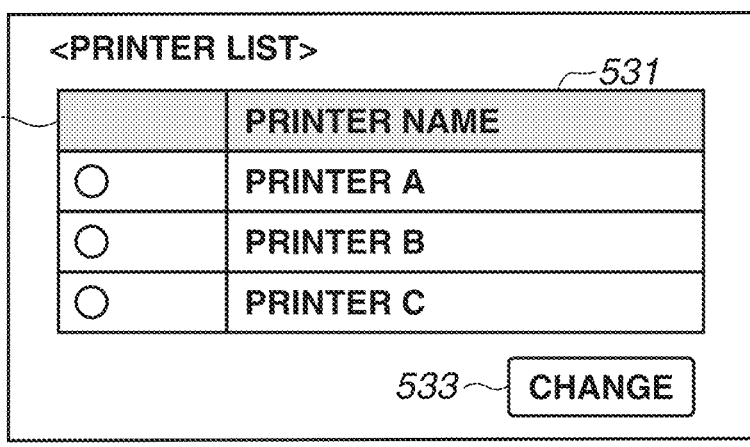
Figure 5E:
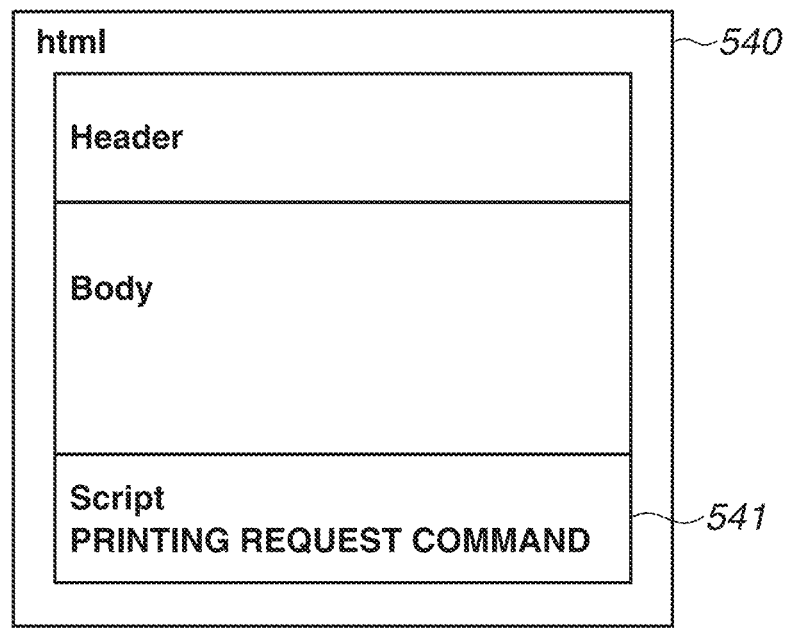

When the web browser 302 detects a press of a change button 522, a request is transmitted to the print server 101. The print server 101 that has received the request generates a printer list screen 530 from the printer information 610, and transmits the printer list screen 530 to the web browser 302. An example of the printer list screen 530 is illustrated in FIG. 5D. The printer list screen 530 includes a printer selection radio button 531, a printer name 532, and a change button 533. When the web browser 302 detects a press of the change button 533, the printer information selected with the printer selection radio button 531 is transmitted to the print server 101.

The print server 101 updates the printer name 524 of the print setting screen 520 to the printer name selected with the printer selection radio button 531, and transmits the updated print setting screen 520 to the web browser 302.

When the web browser 302 detects a press of the print button 523 at the print setting screen 520, the print setting 521, the printer name 524, and a list of documents selected by the document selection checkboxes 511 are transmitted to the print server 101. Herein, in the print setting screen 520, the list of documents selected with the document selection checkboxes 511 in the document list screen 510 is retained as a hidden parameter.

The processing of transmitting a printing request to the print server 101 via the web browser 302 has been described above.

<Print Data Conversion Processing of Print Server 101>

With reference to flowcharts in FIGS. 9 to 11, a method for accelerating the first printout time while detecting imperfect print data and preventing imperfect print data from being printed will be described.

The print data conversion processing executed by the print server 101 will be described below. FIG. 9 is a flowchart illustrating the print data conversion processing executed by the print server 101. The configuration already described above with reference to FIG. 4B will be described in a simplified manner.

After the print data management unit 408 receives a printing instruction from the control server 402, in step S901, the print data management unit 408 acquires document data from the document URL 624 in the storage server 102 and transmits a print data conversion processing request to the data conversion unit 409.

In step S902, the print data management unit 408 generates a print data file URL after the print data is generated through the print data conversion processing performed by the data conversion unit 409. In addition, print data generated through the print data conversion processing is at least a part of the document data.

In step S903, the print data management unit 408 calculates a hash value for print data corresponding to the print data file URL generated in step S902. The hash value is a result of calculation using a hash function. The hash value is used for ensuring completeness of data because the same value is always acquired with respect to the same input data.

In step S901, the print data management unit 408 describes the print data file URL and the calculated hash value in the index file 701, and uploads the index file 701 to the storage server 102. At this time, acquirable print data exists in step S912 in FIG. 10 (described below). Thus, processing of acquiring print data (i.e., processing in step S913 and subsequent steps) performed by the pull print application 303 is started. In a case where the print data file URL and the hash value have been already described in the index file 701 when the processing in step S904 is to be executed, the print data file URL and the hash value is described additionally. Updating the index file retained in the storage server 102 causes the processing in step S904 to be repeated.

After the index has been uploaded in step S904, in step S905, the print data management unit 408 determines whether conversion processing of the print data is completed by checking whether any remaining print data file is present.

The print data management unit 408 ends the processing if print data conversion processing of the data conversion unit 409 has been completed (YES in step S905), and repeats similar processing in steps S902 to S905 with respect to the remaining print data files if print data conversion processing has not been completed (NO in step S905).

In step S905, the print data acquisition unit 412 executes determination on whether the data conversion unit 409 has completed the conversion processing. More specifically, the print data management unit 408 manages the state of the print data conversion processing ("conversion start", "conversion completed", and "conversion error") and updates "true" and "false" of the index file. The print data acquisition unit 412 determines whether conversion processing has been ended based on a result of the update. The print data conversion processing of the print server 101 has been described above.

<Printing Processing of Pull Print Application 303>

The processing of acquiring print data and detecting imperfectness of print data and preventing the print data from being printed, executed by the pull print application 303, will be described with reference to FIG. 10. This processing starts in response to the print data management unit 408 transmitting the index file URL 606 to the pull print application 303.

In step S911, the print data acquisition unit 412 of the pull print application 303 acquires the index file 701 uploaded in step S904 from the storage server 102. At this time, the print data acquisition unit 412 saves the print data URL 704 and the hash value 705 described in the index file 701 as the print data URL 636 and the hash value 637 of the printing queue information 630.

In step S912, the print data acquisition unit 412 accesses the storage server 102 based on the print data URL 636 and determines whether acquirable print data exists. If the print data acquisition unit 412 determines that acquirable print data exists (YES in step S912), the processing in step S913 is executed. If the print data acquisition unit 412 determines that acquirable print data does not exist (NO in step S912), the processing ends.

In step S913, the print data acquisition unit 412 acquires print data from the storage server 102. In a case where the print data is compressed through the compression method 615, decompression processing is executed when the processing in step S913 is to be executed.

In step S914, the print data acquisition unit 412 calculates a hash value with respect to the print data decompressed in step S913 and updates the total hash value 638.

Figure 12:
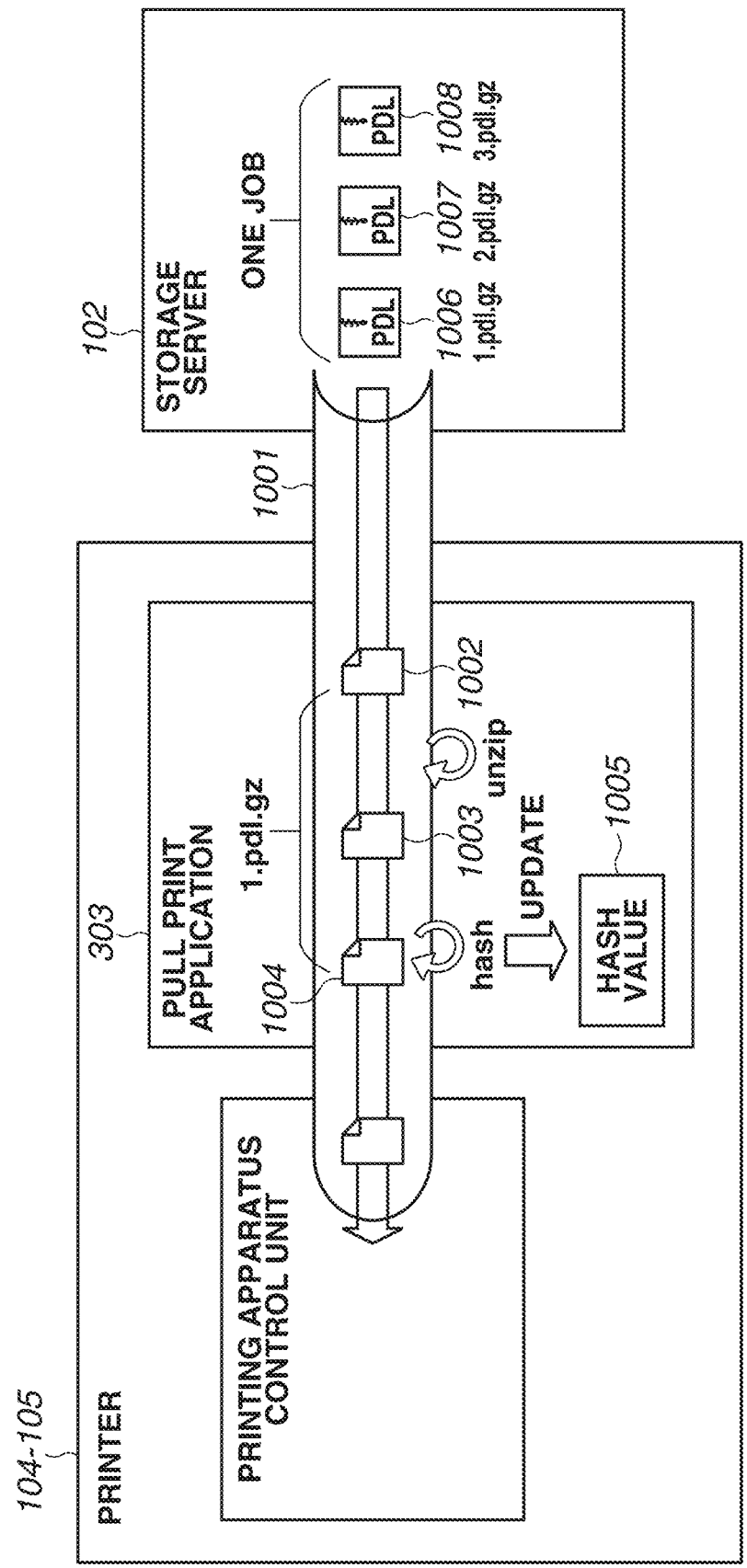
FIG. 12 is a conceptual diagram of printing processing of the pull-print application.

The processing in step S914 will be specifically described with reference to FIG. 12. FIG. 12 is a conceptual diagram illustrating a state where the storage server 102 and the printing apparatus control unit 304 are connected with a stream 1001 via the pull print application 303. The stream 1001 indicates a state where the print data file acquisition communication stream 801 and the printer communication stream 802 are maintained as a single communication stream. In the present exemplary embodiment, it is assumed that one print job includes three print data files 1006 to 1008. When the pull print application 303 acquires one print data file, the print data file is transmitted via the network in a unit of a plurality of network packets 1002 to 1004. The print data acquisition unit 412 executes decompression and hash value calculation for each of the network packets 1002 to 1004, and the print job transmission unit 416 transmits a hash value 1005 to the printing apparatus control unit 304. By updating the hash value in a unit of network packets, a total hash value of the print data file can be acquired eventually. Details of the processing in step S914 have been described above.

Figure 10:
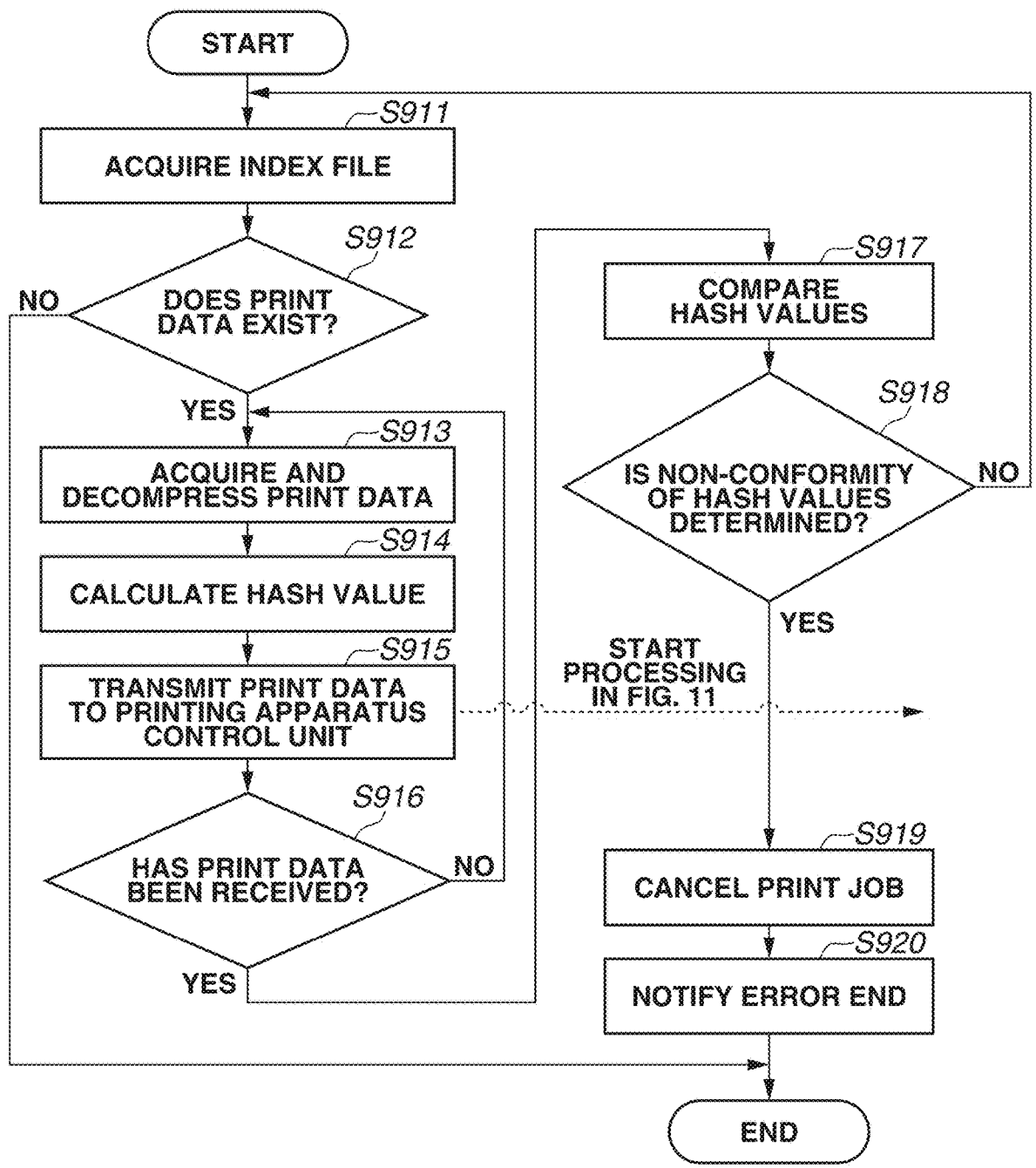
FIG. 10 is a flowchart illustrating printing processing of the pull-print application.
Figure 11:
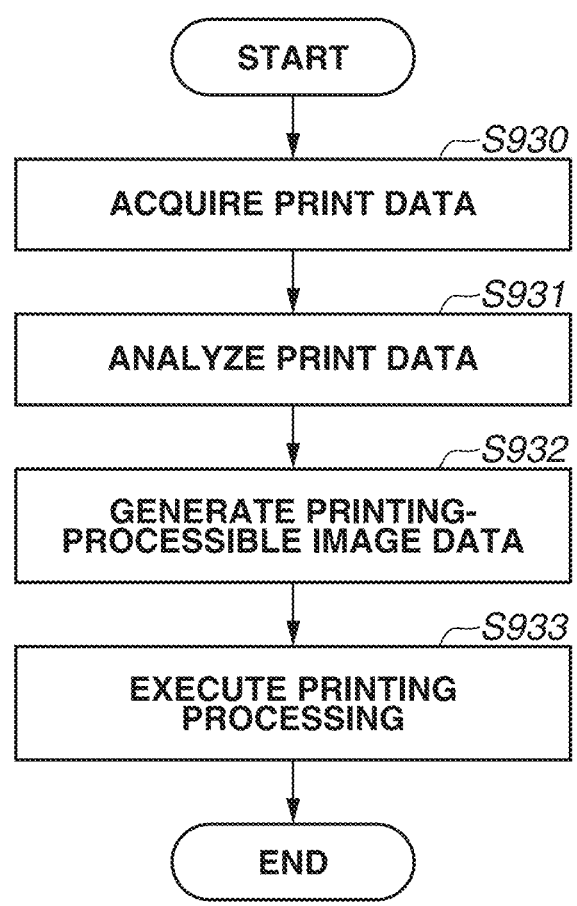
FIG. 11 is a flowchart illustrating printing processing of a printer.

Returning now to description of the flowchart in FIG. 10, in step S915, the print job transmission unit 416 transmits the print data acquired by the print data acquisition unit 412 to the printing apparatus control unit 304 in a unit of network packets. At that time, printing processing in FIG. 11 (described below) is started by the printing apparatus control unit 301.

In step S916, the print job transmission unit 416 determines whether reception of print data corresponding to one print data file has been completed. If the print job transmission unit 416 determines that the reception of the print data corresponding to one print data file has been completed (YES in step S916), the processing in step S917 is executed, if the print job transmission unit 416 determines that the reception of the print data corresponding to one print data file has not been completed (NO in step S916), the processing returns to step S913.

In step S917, the print data acquisition unit 412 compares the hash value 637 acquired in step S911 and the total hash value 638 calculated in step S914. In a case where the print data acquisition unit 412 compares the hash value 637 and the total hash value 638 and determines that the hash value 637 does not conform to the total hash value 638 in step S918, the acquired print data is determined to be imperfect (YES in step S918), and the processing in step S919 is executed. If conformity thereof is determined in step S918 (NO in step S918), the processing returns to step S911, and the acquisition processing of the subsequent index file is executed.

The comparison processing in steps S917 and S918 will be described below. The hash value 637 is the hash value 705 described in the index file calculated by the print server 101. The total hash value 638 is a total value acquired by adding the hash values calculated by the print data acquisition unit 412 of the printer-A 104 based on the network packets 1002 to 1004. If a condition "Hash Value of the network packet 1002+Hash Value of the network packet 1003+Hash Value of Communication Data 1004=Total Hash Value 638" is satisfied, it is determined that data loss has not occurred in the network transmission path.

In step S919, the print data acquisition unit 412 transmits a print job cancellation request of the printing apparatus control unit 304 to the printing control unit 415. In step S920, the print data acquisition unit 412 notifies the print data management unit 408 of a printing error. The acquisition processing of print data, and processing of detecting imperfectness of print data and preventing printing from being executed have been described above.

<Printing Processing of Printer>

Printing processing of the printer-A 104 will be described with reference to FIG. 11. This processing is started in response to the printing apparatus control unit 304 having received the print data in step S915.

In step S930, the printing apparatus control unit 304 receives print data from the print data acquisition unit 412 via the network interface unit 417. In step S931, the printing apparatus control unit 304 analyzes the received print data. In step S932, the printing apparatus control unit 304 generates printing-processible image data based on the print data analyzed in step S931. In step S933, the printing apparatus control unit 304 transmits the generated image data to the print engine 238 and executes printing processing.

In the present exemplary embodiment, since priority is placed on accelerating of the first printout time, printing processing is started before imperfect print data is detected. Thus, output of imperfect printed product cannot be stopped completely. However, in a general printer, it is assumed that time taken for a print engine to actually start operating and executing printing after the processing in steps S930 to S932 is longer than time taken for network communication in steps S915 to S918. Accordingly, in step S919, the print job can be cancelled after the imperfect print data is detected. The printing processing executed by the printer-A 104 has been described above.

According to the present exemplary embodiment, in a system in which print data about a completed page is sequentially transmitted to a printer without waiting for completion of all of print data and the transmitted print data is sequentially printed, the print server 101 can prevent imperfect printed product from being output by detecting the imperfect print data.

A second exemplary embodiment of the present disclosure will be described below in detail. According to the processing described in the first exemplary embodiment, while an error due to imperfect print data can be detected, the user has to manually execute reprinting, which is inconvenient. In the present exemplary embodiment, recovery processing is executed automatically in a case where an error caused by imperfect print data has occurred. In addition, reference numbers and names the same as those in the first exemplary embodiment are used in the appended drawings unless otherwise specified.

Here, among the print data files generated by the print data management unit 408, the print data file corresponding to the print data file URL that is firstly generated is called as "first data file", and print data files other than the first data file are called as "subsequent data files". For example, in FIG. 12., the data file 1006 is the first data file, and the data files 1007 and 1008 are subsequent data files.

<Processing Executed by Print Data Acquisition Unit 412 in Acquisition of First Data File>

Figure 13:
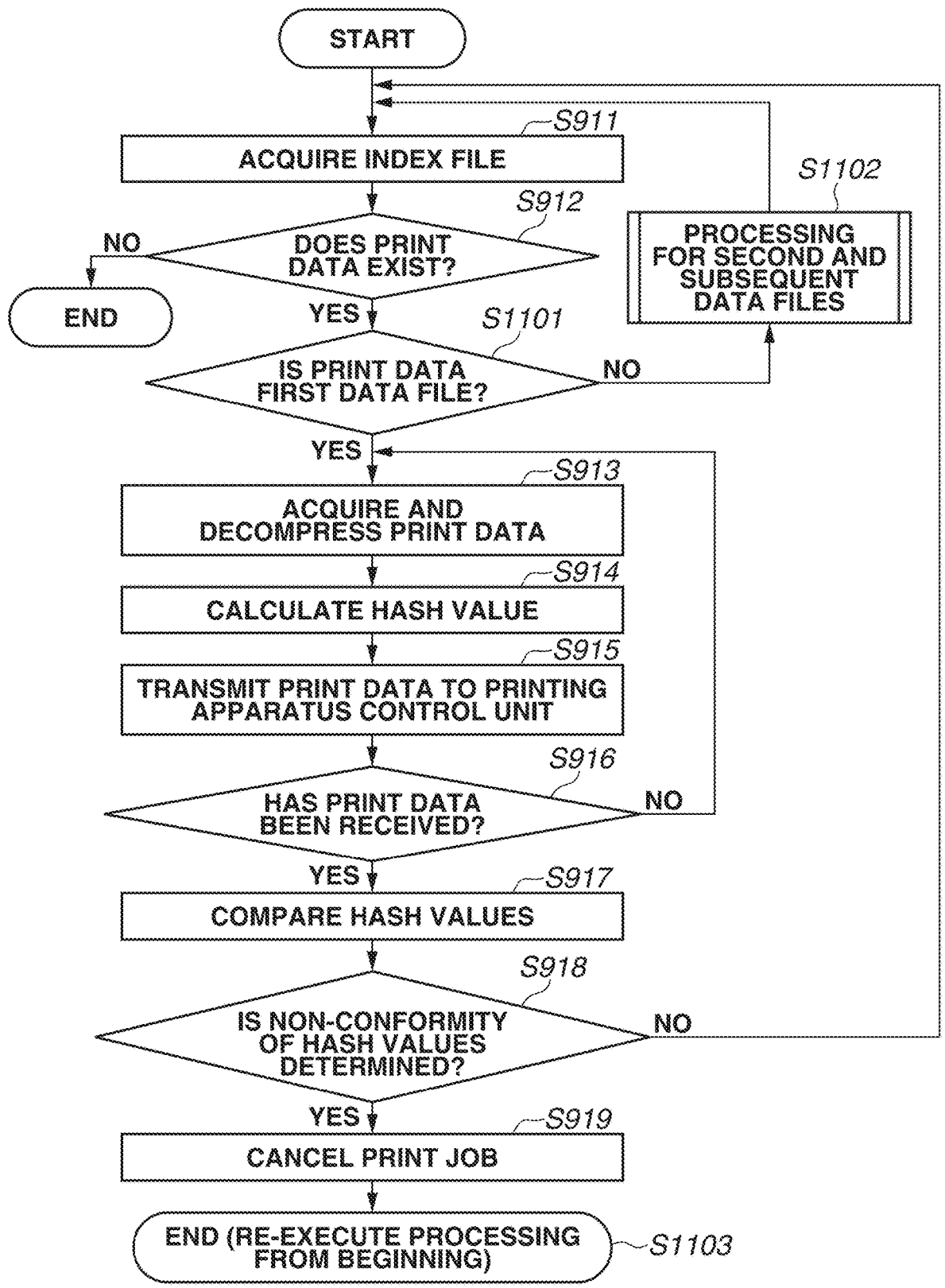
FIG. 13 is a flowchart illustrating printing processing executed when the pull-print application acquires a first data file.

FIG. 13 is a flowchart illustrating processing to be executed when the print data acquisition unit 412 acquires the first data file.

In step S1101, the print data acquisition unit 412 determines whether print data acquired from the storage server 102 is the first data file of a target print job. A determination method used in step S1101 is not limited in particular. For example, determination may be made based on the information described in the index file 701, or determination may be made based on the content of the acquisition information managed by an application or the content of print data received previously.

If the print data is determined to be the first data file (YES in step S1101), calculation of the hash value and update processing of the total hash value 638 are executed in steps 5913 to 5916 based on the acquired first data file. If it is determined that the print data is not the first data file but a subsequent data file (NO in step S1101), the processing in step S1102 is executed. The processing in step S1102 will be described below with reference to FIG. 14.

After non-conformity of the hash value is determined in step S918, printing cancellation processing is executed in step S919. Then, in step S1103, the print data acquisition unit 412 does not treat the print job as an error, and the processing returns to step S911. This configuration enables retry processing to be automatically executed without a need of a user's manual operation, in a case where imperfectness is detected in the first data file.

<Processing Executed by Print Data Acquisition Unit 412 in Acquisition of Subsequent Data File>

Figure 14:
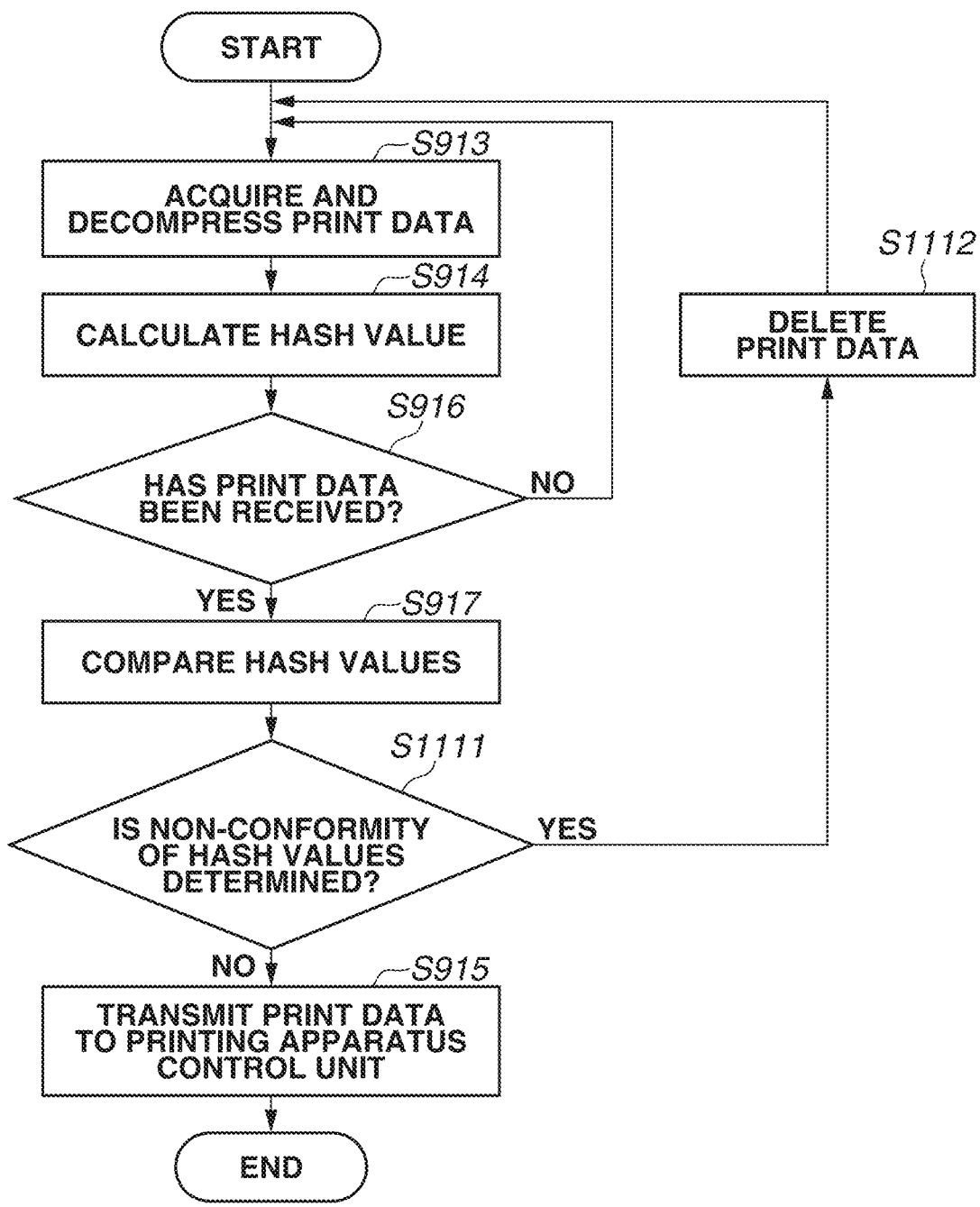
FIG. 14 is a flowchart illustrating printing processing executed when the pull print application acquires a subsequent data file.

FIG. 14 is a flowchart illustrating processing to be executed in a case where the print data acquisition unit 412 acquires a subsequent data file. This processing is started when the print data file acquired by the print data acquisition unit 412 is determined to be the subsequent data file in step S1101.

First, in steps S913 to S917, the print data acquisition unit 412 calculates hash values from the acquired print data and compares the hash values. If the print data acquisition unit 412 compares the hash values and determines non-conformity of the hash values in step S1111 (YES in step S1111), the processing in step S1112 is executed. If conformity of the hash values is determined (NO in step S1111), the processing in step 5915 is executed.

If non-conformity of the hash values is determined in step S1111, the processing proceeds to step S1112, in step S1112, the print data acquisition unit 412 deletes the print data existing in the print data file acquisition communication stream 801. After executing the processing in step S1112, the print data acquisition unit 412 executes the processing in step S913 with respect to the same print data URL 636 again.

The processing executed by the print data acquisition unit 412 in acquisition of the subsequent data file has been described above. Through the processing in FIG. 14, even in a case where imperfectness is detected in the subsequent data file, retry processing can be automatically executed without a need for a user to perform manual operation.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-221614, filed Nov. 17, 2017, which is hereby incorporated by reference herein in its entirety.

What is claimed is:

1. An information processing system comprising:
a print server configured to convert document data into print data; and
an image processing apparatus configured to sequentially acquire the print data and execute printing processing,
wherein the print server comprising:
at least one processor and at least one memory coupled to the at least one processor, the at least one memory having stored thereon instructions, which, when executed by at least the one processor, cause the at least one processor cooperating to act as:
a first calculation unit configured to calculate a first hash value based on the print data;
a writing unit configured to write on an index file the first hash value of the print data and information about an acquisition source of the print data;
wherein the image processing apparatus comprising:
at least one processor and at least one memory coupled to the at least one processor, the at least one memory having stored thereon instructions, which, when executed by at least the one processor, cause the at least one processor cooperating to act as:
an acquiring unit configured to acquire the index file where the first hash value is written, and acquire the print data referring to the information written on the index file;
a second calculation unit configured to calculate a second hash value by using the print data acquired by the acquiring unit;
a comparison unit configured to compare the first hash value, written on the index file and the second hash value, calculated in the image processing apparatus; and
wherein, in a case where the first hash value and the second hash value are not the same, printing processing using the print data is canceled and the acquiring unit acquires again the print data referring to information written on an index file,
wherein the first calculation unit describes the first hash value calculated based on the print data into the index file in which a print data uniform resource locator (URL) indicating the acquisition source of the print data is described,
wherein the first hash value is a hash value which is added when the print data URL is to be described in the index file, and
wherein the second hash value is a hash value which is acquired through addition when the print data is acquired.

2. The information processing system according to claim 1, further comprising;
an execution unit configured to execute printing processing by using the print data in a case where the comparison unit determines that the first hash value and the second hash value are the same.

3. The information processing system according to claim 1, wherein the second calculation unit acquires print data specified by the print data URL described in the index file and calculates the second hash value by using the acquired print data.

4. The information processing system according to claim 1, further comprising;
a storage server configured to store the print data and an index file in which a print data URL indicating an acquisition source of the print data is described,
wherein the image processing apparatus maintains, as one stream, a first communication stream for acquiring print data from the storage server and a second communication stream, in the image processing apparatus, for transmitting the print data to a controller configured to execute printing processing.

5. The information processing system according to claim 1, wherein, in a case where the first hash value and the second hash value are not the same, printing processing using the print data is canceled and the acquiring unit acquires again an index file where an acquisition source of the print data is written.

6. The information processing system according to claim 5, further comprising;
a determination unit configured to determine whether the print data is a first data file among print data files included in a print job,
wherein, in a case where the comparison unit determines that the first hash value and the second hash value are not the same after the determination unit determines that the print data file is not the first data file, the print data existing in a first communication stream is deleted.

7. The information processing system according to claim 6, wherein, in a case where, after the determination unit determines that the print data file is the first data file, the first hash value calculated by the print server based on the first data file and the second hash value calculated by the image processing apparatus by using the first data file are compared and determined to be the same the first data file is transmitted to a controller that executes the printing processing.

8. A control method of an information processing system including a print server configured to convert document data into print data and an image processing apparatus configured to sequentially acquire the print data and execute printing processing, the control method comprising:

calculating, as a first calculation, a first hash value based on the print data with the print server;

writing on an index file the first hash value of the print data and information about an acquisition source of the print data;

acquiring the index file where the first hash value is written, and acquire the print data referring to the information written on the index file;

calculating, as a second calculation, a second hash value by using the print data acquired with the image processing apparatus;

comparing the first hash value, written on the index file and the second hash value, calculated in the image processing apparatus; and wherein, in a case where the first hash value and the second hash value are not the same, printing processing using the print data is canceled and the print data referring to information written on an index file is acquires again, wherein the first calculation describes the first hash value calculated based on the print data into the index file in which a print data uniform resource locator (URL) indicating the acquisition source of the print data is described, wherein the first hash value is a hash value which is added when the print data URL is to be described in the index file, and wherein the second hash value is a hash value which is acquired through addition when the print data is acquired.

* * * * *